United States Patent
Zhang et al.

(10) Patent No.: US 10,326,932 B2
(45) Date of Patent: Jun. 18, 2019

(54) PANORAMIC IMAGE ACQUISITION DEVICE

(71) Applicant: Chengdu Eapil Technology. Ltd, Chengdu, Sichuan (CN)

(72) Inventors: Enze Zhang, Sichuan (CN); Wenjie Lai, Sichuan (CN); Zhifa Hu, Sichuan (CN); Yin Cheng, Sichuan (CN); Li Yu, Sichuan (CN)

(73) Assignee: Chengdu Eapil Technology. Ltd, Chengdu, Sichuan (CN)

( * ) Notice: Subject to any disclaimer, the term of this patent is extended or adjusted under 35 U.S.C. 154(b) by 76 days.

(21) Appl. No.: 15/364,198

(22) Filed: Nov. 29, 2016

(65) Prior Publication Data
US 2017/0085793 A1 Mar. 23, 2017

(51) Int. Cl.
*H04N 5/232* (2006.01)
*G02B 13/06* (2006.01)
*G02B 5/04* (2006.01)

(52) U.S. Cl.
CPC ......... *H04N 5/23238* (2013.01); *G02B 13/06* (2013.01); *G02B 5/04* (2013.01)

(58) Field of Classification Search
CPC ....... H04N 5/23238; G02B 13/06; G02B 5/04

USPC .......................................................... 348/38
See application file for complete search history.

(56) References Cited

U.S. PATENT DOCUMENTS

2007/0182812 A1* 8/2007 Ritchey ............... H04N 5/2254
348/36
2017/0094169 A1* 3/2017 Yoshikawa ......... H04N 5/2254

* cited by examiner

*Primary Examiner* — Nguyen T Truong

(57) ABSTRACT

A panoramic image acquisition device includes: fish-eye lens modules, an image sensor and a signal cable, wherein: there are two sets of the fish-eye lens modules, and optic axes thereof coincide with each other; the fish-eye lens modules are arranged at two ends of the optic axes; a prism is provided at a center of a line connecting two optic center of the fish-eye lens modules; and the image sensor is provided below the prism for acquiring images of the fish-eye lens modules. The panoramic image acquisition device of the present invention achieves complete image quality unification and full image synchronization of different view fields in a panoramic image. Meanwhile, the panoramic image acquisition device has only one channel of video output, which greatly simplifies data acquisition tasks and panorama stitching tasks of panoramic image post-treatment, so as to reduce difficulty and costs.

8 Claims, 2 Drawing Sheets

PANORAMIC IMAGE ACQUISITION DEVICE

BACKGROUND OF THE PRESENT INVENTION

Field of Invention

The present invention relates to a panoramic image acquisition technology, and more particularly to a whole-celestial-sphere panoramic image acquisition and processing technology.

Description of Related Arts

Conventionally, the widely used panoramic image acquisition device comprises multiple sensors for respectively acquiring images at different view angles, wherein at least two image sensors are required. Generally, there are two, three, four, five, six or more sensors for acquiring a panoramic image. Multiple lenses are able to acquire a panoramic image by covering a view angle of 360 degrees, but the multiple sensors independently acquire different images within different view fields, and multiple sensor chips have different sensitization parameters, leading to different effects such as color temperatures and brightness of the images acquired by different sensors. In addition, synchronization between image signals from different sensor chips is insufficient, so postures and positions of the same moving object will be unsynchronized during imaging of different sensors.

Meanwhile, the multiple sensors require a high performance of a post-treatment chip, which not only require video input and image synchronization of at least two channels, but also require relatively high standards of hardware interfaces, drivers, computing power, etc. Conventionally, such processor on the market is costly with high development difficulty and cost, and is difficult to cooperate with conventional image processing modules. Furthermore, the module needs multiple sensors and lenses, causing extra module cost.

SUMMARY OF THE PRESENT INVENTION

Referring to defects of conventional technologies, the present invention provides a panoramic image acquisition device. For overcoming disadvantages of multi-sensor panoramic image acquisition devices such as non-identical image qualities, unsynchronized images and high costs, the present invention provides a single-sensor panoramic image acquisition device, which needs only one sensor chip for acquiring a panoramic image, so as to effectively lowering the costs and overcoming non-identical imaging of different sensors.

Accordingly, in order to accomplish the above objects, the present invention provides:

a panoramic image acquisition device, comprising: fish-eye lens modules, an image sensor and a signal cable, wherein:

there are two sets of the fish-eye lens modules, and optic axes thereof coincide with each other; the fish-eye lens modules are arranged at two ends of the optic axes; a prism is provided at a center of a line connecting two optic center of the fish-eye lens modules; and the image sensor is provided below the prism for acquiring images of the fish-eye lens modules.

Each of the fish-eye lens modules comprises a plurality of lenses, and has a view angle of more than 180 degrees.

The fish-eye lens modules, the prism and the image sensor are symmetrically arranged according to a perpendicular bisector of a line connecting the fish-eye lens modules.

The image sensor is a CCD (charge-coupled device) image sensor or a CMOS (complementary metal oxide semiconductor) image sensor.

Angles between the optic axes and normals of reflectors of the prism are 45 degrees.

According to the present invention, panorama refers to a sphere panoramic field with a horizontal view angle of 360 degrees and a vertical view angle of 360 degrees.

According to the present invention, the panoramic image acquisition device has two ultra-wide-angle fish-eye lens modules which divide a panoramic view field into a front and a rear view fields for respectively imaging. Imaging optical signals pass through ultra-wide angle lenses and arrive at two reflectors at both sides of the prism at a center of the lens modules. The imaging optical signals are reflected by the prism for respectively imaging at a left and a right areas of a sensor target face at the same time. According to the present invention, there is a transitional region between the left and the right areas for isolating interference between the front and the rear optical signals. In order to take fully advantage of imaging areas of the imaging chip, the imaging chip adapts an optical element with an aspect ratio of 16:9, and images finally reflected to the sensor are processed with edge trimming. Due to the large target face and a high resolution of the image sensor, a resolution of a final image is able to achieve 2-6 million or more. Because only one image acquisition chip is used, only one channel of final image data signal is outputted.

Beneficial effects of the present invention are as follows. The panoramic image acquisition device of the present invention achieves complete image quality unification and full image synchronization of different view fields in a panoramic image. Meanwhile, the panoramic image acquisition device has only one channel of video output, which greatly simplifies data acquisition tasks and panorama stitching tasks of panoramic image post-treatment, so as to reduce difficulty and costs. The present invention reduces an image sensor chip quantity and a lens quantity, and thus reducing a cost of image acquisition system, while provides a higher and more stable image quality.

Figure 1:
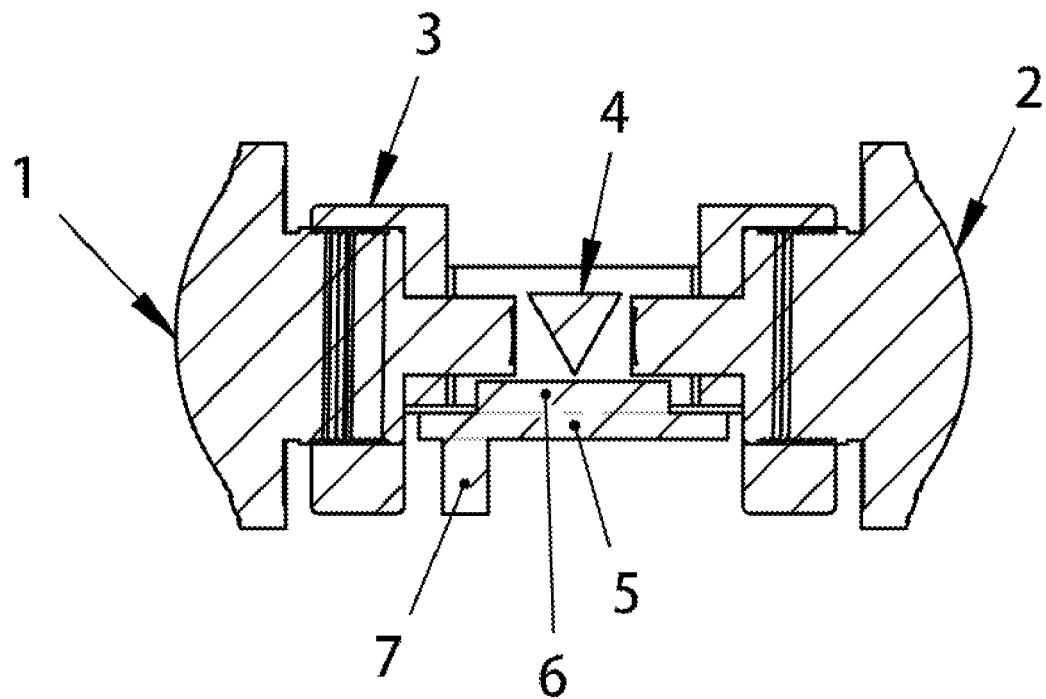
FIG. 1 is a sectional view of a panoramic image acquisition device of the present invention.

Element reference: 1—front fish-eye lens module, 2—rear fish-eye lens module, 3—lens holder, 4—prism, 5—image acquisition circuit board, 6—image sensor, 7—flexible cable socket.

DETAILED DESCRIPTION OF THE PREFERRED EMBODIMENT

Referring to the drawings, the present invention is further illustrated. Embodiments have been shown and described for the purposes of illustrating the functional and structural principles of the present invention and is subject to change without departure from such principles. Therefore, this invention includes all modifications encompassed within the spirit and scope of the following claims.

Figure 2:
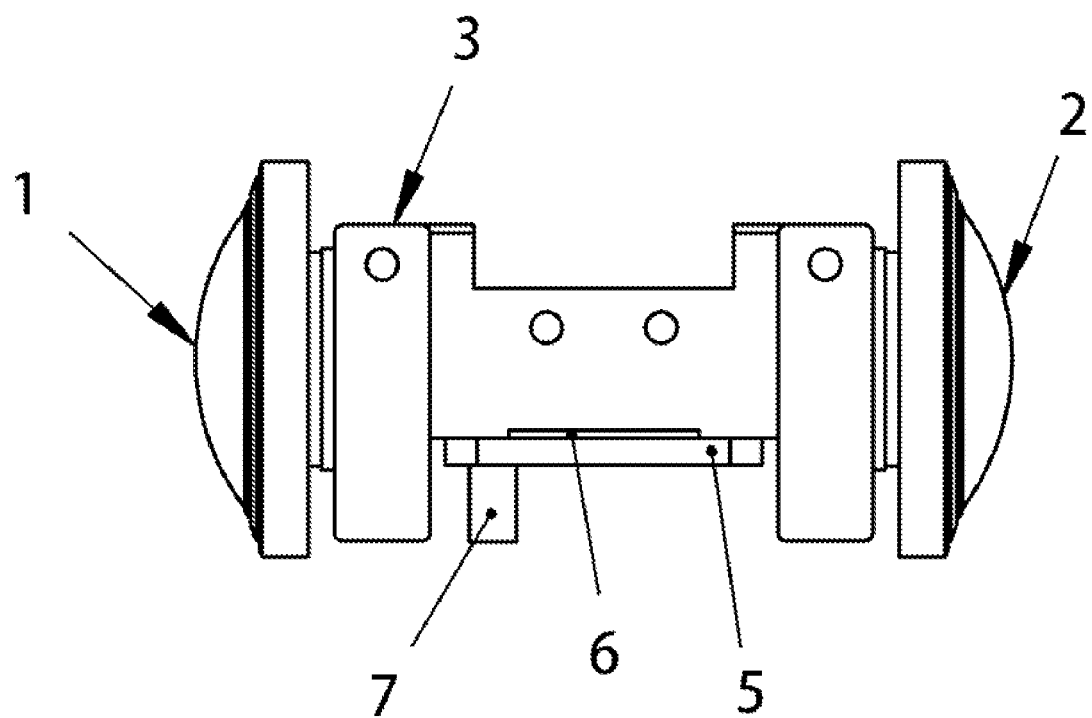
FIG. 2 is a side view of the panoramic image acquisition device of the present invention.
Figure 3:
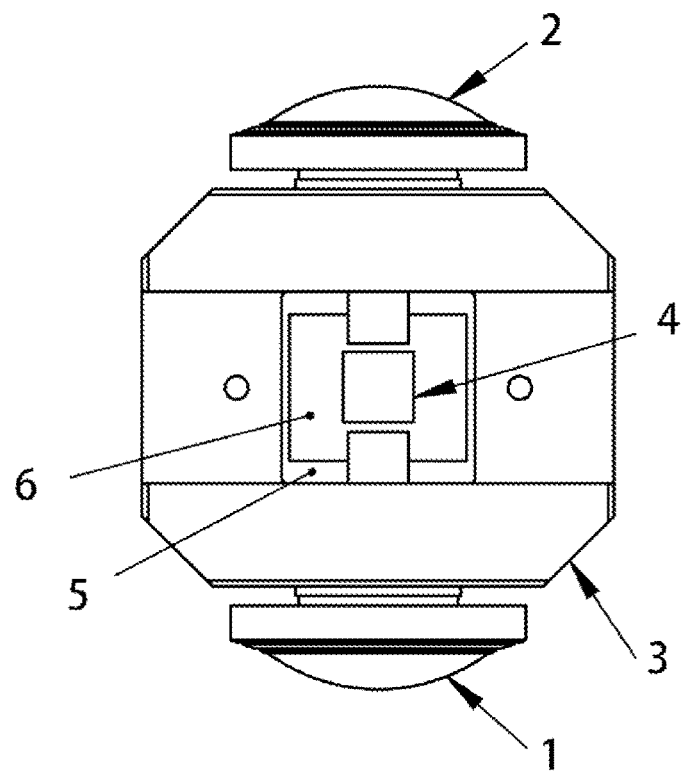
FIG. 3 is a top view of the panoramic image acquisition device of the present invention.
Figure 4:
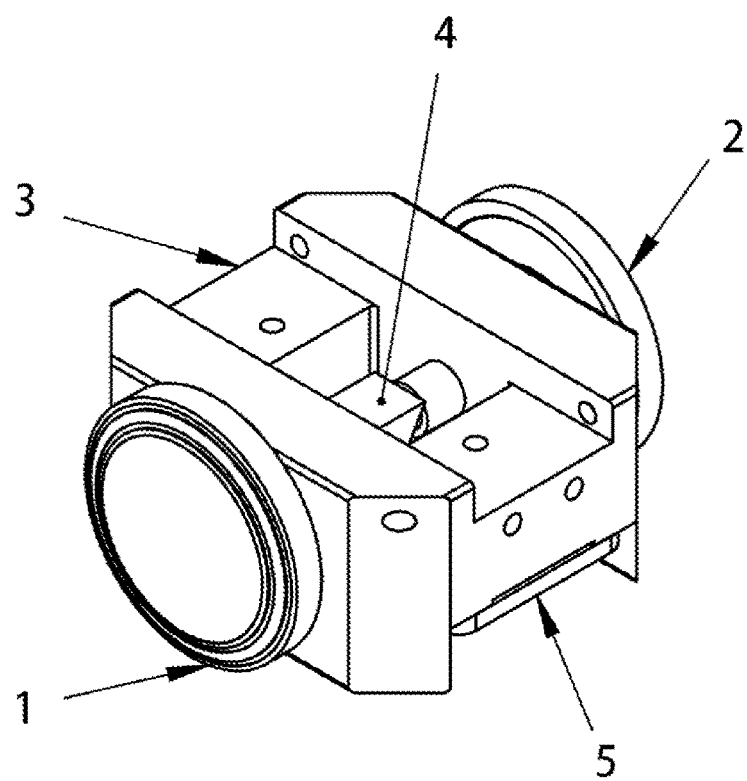
FIG. 4 is a perspective view of the panoramic image acquisition device of the present invention.

Please refer to FIGS. 1-4.

A panoramic image acquisition device comprises: fish-eye lens modules, an image sensor 6 and a signal cable, wherein: there are two sets of the fish-eye lens modules, i.e. a front fish-eye lens module 1 and a rear fish-eye lens module 2, and optic axes thereof coincide with each other; the fish-eye lens modules are arranged at two ends of the optic axes; a prism 4 is provided at a center of a line connecting two optic center of the fish-eye lens modules; and the image sensor 6 is provided below the prism 4 for acquiring images of the fish-eye lens modules.

Each of the fish-eye lens modules comprises a plurality of lenses, and has a view angle of more than 180 degrees.

The fish-eye lens modules, the prism 4 and the image sensor 6 are symmetrically arranged according to a perpendicular bisector of a line connecting the fish-eye lens modules.

The image sensor 6 is a CCD (charge-coupled device) image sensor or a CMOS (complementary metal oxide semiconductor) image sensor.

Angles between the optic axes and normals of reflectors of the prism 4 are 45 degrees.

Referring to FIGS. 1-4, the front fish-eye lens module 1, the rear fish-eye lens module 2 and the prism 4 arranged on the same optical axis, and the optical axis is perpendicular to a normal of a target face of the image sensor 6. The prism 4 is right above the image sensor 6, which is a triangular prism. Lights of a front and a rear view field are synchronously imaged by the fish-eye lens modules before being reflected to the image sensor 6 by the reflectors of the prism 4. A lens holder 3 supports other optical elements. The image sensor and a flexible cable socket 7 are provided on an image acquisition circuit board 5. Influence of the external stray light, dust and water vapor is completely separated by a sealing and water-proofing design.

Referring to the drawings, the prism 4 is right above the image sensor, and a tip thereof is pointed to a boundary at a middle of the image sensor 6. An angle between the optic axis of the front fish-eye lens module 1 and a normal of a front reflector of the prism 4 is 45 degrees, and an angle between the optic axis of the rear fish-eye lens module 2 and a normal of a rear reflector of the prism 4 is also 45 degrees. Considering working accuracy of the tip of the prism, there should be a 3 mm-wide transitional region between the front and the rear view fields. Image signals are transmitted to a signal cable through the flexible cable socket, so as to be outputted.

On one hand, the present invention modifies a conventional structure of multiple lenses+multiple sensors+image stitching into a structure of single-channel lenses+a single-channel sensor, so that the modules are more compact for minimizing a final product, and a module reliability is improved for saving hardware costs. On the other hand, synchronization, exposure and integration of different parts of the panoramic image are achieved by an optical method instead of an original circuit method, which lowers development difficulty of panoramic image technology, and improves imaging quality. Furthermore, since the present invention avoids pre-treatment of the images by the hardware chip (which has limitations on computation, hardware interfaces, drivers, etc.), the image processing module is able to be connected to the module of the present invention as long as common image sensor data interfaces are supported (such as mipi, csi, Parallel, etc.). As a result, it is easy to combine the panoramic technology with conventional image processing modules, so as to broaden an application scope of the panoramic technology.

What is claimed is:

1. A panoramic image acquisition device, comprising: fish-eye lens modules, an image sensor and a signal cable, wherein:

there are two sets of the fish-eye lens modules, and optic axes thereof coincide with each other; the fish-eye lens modules are arranged at two ends of the optic axes; a prism is provided at a center of a line connecting two optic center of the fish-eye lens modules; and the image sensor is provided below the prism for synchronically acquiring images of the fish-eye lens modules;

the images the fish-eye lens modules arrive at two reflectors at both sides of the prism respectively, and are reflected by the prism for respectively imaging at a left area and a right area of a sensor target face synchronically; there is a transitional region between the left area and the right area for isolating interference between optical signals.

2. The panoramic image acquisition device, as recited in claim 1, wherein each of the fish-eye lens modules comprises a plurality of lenses, and has a view angle of more than 180 degrees.

3. The panoramic image acquisition device, as recited in claim 1, wherein the fish-eye lens modules, the prism and the image sensor are symmetrically arranged according to a perpendicular bisector of a line connecting the fish-eye lens modules.

4. The panoramic image acquisition device, as recited in claim 2, wherein the fish-eye lens modules, the prism and the image sensor are symmetrically arranged according to a perpendicular bisector of a line connecting the fish-eye lens modules.

5. The panoramic image acquisition device, as recited in claim 3, wherein the image sensor is a CCD (charge-coupled device) image sensor or a CMOS (complementary metal oxide semiconductor) image sensor.

6. The panoramic image acquisition device, as recited in claim 4, wherein the image sensor is a CCD image sensor or a CMOS image sensor.

7. The panoramic image acquisition device, as recited in claim 3, wherein angles between the optic axes and normals of the reflectors of the prism are 45 degrees.

8. The panoramic image acquisition device, as recited in claim 4, wherein angles between the optic axes and normals of the reflectors of the prism are 45 degrees.

* * * * *